United States Patent [19]

Kazik et al.

[11] 3,894,452

[45] July 15, 1975

[54] CONTROL ARRANGEMENT FOR MULTI-SPINDLE AUTOMATIC SCREW MACHINE AND THE LIKE

[75] Inventors: Horst Kazik, Schloss Holte; Walter Plassmeier, Detmold, both of Germany

[73] Assignee: Gildemeister Aktiengesellschaft, Bielefeld, Germany

[22] Filed: Dec. 27, 1973

[21] Appl. No.: 428,908

[30] Foreign Application Priority Data

Jan. 4, 1973 Germany............................ 2300249

[52] U.S. Cl.................... 82/21 B; 82/2 B; 82/21 A; 340/347 R
[51] Int. Cl.......................... B23b 21/00; G08c 9/00
[58] Field of Search............... 82/5, 21 B, 2 B, 2 R; 235/151.11; 340/149 R, 146.2, 347 R; 318/567, 69, 601

[56] References Cited
UNITED STATES PATENTS

| 3,174,367 | 3/1965 | Lukens ..................................... 82/5 |
| 3,267,429 | 8/1966 | Strohmeyer..................... 340/146.2 |
| 3,381,557 | 5/1968 | Dunn ........................................ 82/5 |
| 3,448,642 | 6/1969 | Shultz ..................................... 82/21 |
| 3,595,106 | 7/1971 | Pomella et al. ........................... 82/1 |
| 3,676,849 | 7/1972 | Malandro et al................ 340/149 R |
| 3,705,400 | 12/1972 | Cordes, Jr....................... 340/347 R |
| 3,715,939 | 2/1973 | Leschenne .......................... 82/21 B |

Primary Examiner—J. M. Meister
Assistant Examiner—W. R. Briggs
Attorney, Agent, or Firm—Michael S. Striker

[57] ABSTRACT

A machine tool includes a work tool arrangement, a workpiece holding arrangement, a plurality of control units activatable for initiating and terminating respective predetermined movements of at least one of the two arrangements, and a timing arrangement for timing the activation of the control units. The timing arrangement includes a rotary timing member, such as a control shaft, a first device for generating a signal having a value indicative of the angular position of the rotary timing member, a second device for detecting when the signal assumes a predetermined value corresponding to a predetermined angular position of the rotary timing member, and a third device for activating a predetermined one of the control units in response to such detection.

4 Claims, 3 Drawing Figures

CONTROL ARRANGEMENT FOR MULTI-SPINDLE AUTOMATIC SCREW MACHINE AND THE LIKE

BACKGROUND OF THE INVENTION

Multi-spindle automatic screw machines and the like are conventionally provided with control means comprised essentially of a rotating control shaft on which are mounted a plurality of information carriers, such as cams for the transmission of information in mechanical form and/or such as cam drums cooperating with switches for the transmission of control information in electrical form. For example, the control shaft may be provided with a cam which engages a moving part of the automatic screw machine. As the control shaft turns, the cam arrangement effects predetermined movement of such moving part, for example a workpiece holding unit or a work tool holding unit. Alternatively, the control shaft may be provided with cams which trip switches when the control shaft assumes predetermined angular positions, the switches in turn activating hydraulic or electrical moving means for effecting predetermined movements of different aggregates within the automatic screw machine.

Control arrangements of this type have the disadvantage that when the automatic screw machine, or other similar machine tool, is to be set up for a workpiece different from the workpieces previously worked upon, the adjustments involved in such setting-up can be very time-consuming and expensive. For example, when the movements of the different aggregates of the automatic screw machine are timed by specially configured cams provided on the rotating control shaft, a change of the type of workpiece to be worked upon, or a change of the work to be done on workpieces of a particular type, will usually necessitate replacement of many or most of the control cams, with often the concomitant need for the design and fabrication of specially configured control cams of different design. Such changeovers are often very time-consuming and expensive. As a result, it is usual practice to employ machine tools of the type in question only when large numbers of identical workpieces are to be worked upon in identical manner, the machine tools not being so often employed for small-lot jobs.

Also, the mechanical timing and control of the movements of the carriage for the work-holding unit is often expensive and when linkage levers are employed may be characterized by an undesirable degree of elasticity. When a cam drum is used in conjunction with cam-operated switches, it is often very difficult to locate the cams on the cam drum in exactly the correct position.

SUMMARY OF THE INVENTION

It is accordingly the general object of the present invention to provide a control arrangement for multi-spindle automatic screw machines, and other similar machine tools, which is not characterized by the disadvantages just enumerated.

More specifically, it is an object of the invention to provide a control arrangement for a machine tool which permits quick changeovers from one timing schedule to another, when the machine is to be set-up for work upon a different type of workpiece, or for different work on the same type of workpiece.

It is another object to provide such an arrangement wherein the changeovers in question can be performed substantially without any expense.

It is a further object to provide such an arrangement wherein the changeovers although quickly effected can be made with the utmost precision.

It is still another object to provide such an arrangement wherein changeovers of the greatest variety can be effected.

These objects, and others which will become more understandable from the following description of an exemplary embodiment, can be met, according to one advantageous concept of the invention by providing, in a machine tool of the type comprised of work tool means, workpiece holding means, a plurality of control units activatable for initiating and terminating respective predetermined movements of at least one of said means, a novel timing arrangement for timing the activation of said control units. The timing arrangement advantageously comprises a rotary timing member, first means for generating a signal having a value indicative of the angular position of said rotary timing member, second means for detecting when said signal assumes a predetermined value corresponding to a predetermined angular position of the rotary timing member, and third means for activating a predetermined one of the control units in response to such detection.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
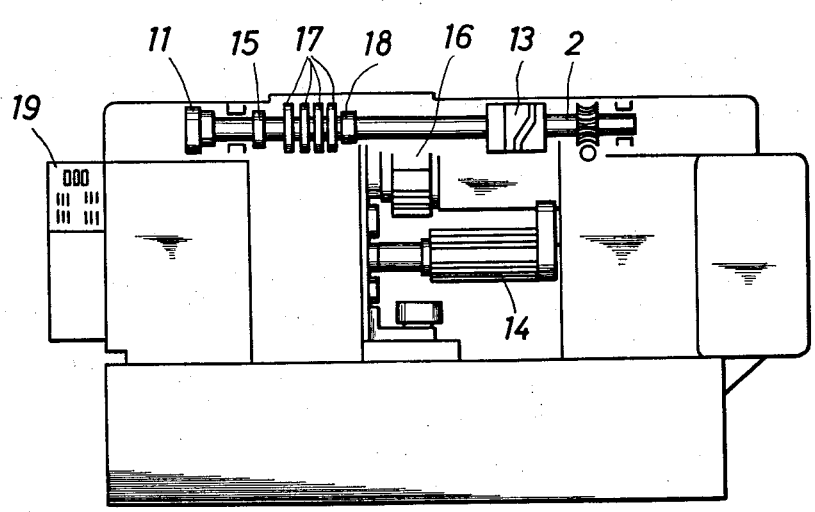
FIG. 1 depicts very schematically the general appearance of a multi-spindle automatic screw machine provided with a mechanical timing arrangement for the timing of the work feed and other machine operations.

FIG. 1 depicts in somewhat schematic manner the general appearance of a multi-spindle automatic screw machine. The machine includes a conventional control shaft 2, constituting a rotary timing member. The control shaft 2 is driven by means of a non-illustrated motor via a gear arrangement with different speeds for work feeding and for quick-traverse movements. Mounted on control shaft 2 is a conventional cam drum 13 for the control of the movement of a main slide 14. Also mounted on the control shaft 2 is a plurality of cam 17 for the control of the movement of the cross-slide 16, and a switching arrangement 15 and an indexing lever 18 for the driving and positioning of the spindle drum.

Furthermore mounted on the control shaft 2 is a unit 11 operative for generating signals indicative of the angular position of the control shaft and indicative of the direction of rotation of the control shaft. The signals generated by position- and direction-indicating unit 11 are applied to a circuit arrangement 19. Circuit 19 is operative for activating various control units of the automatic screw machine in dependence upon the angular position of the control shaft 2. Such control units may for example be comprised of electrical, hydraulic, or electrohydraulic moving means activatable by activating respective electrical control switches or control valves. These control units when activated may be operative for initiating or terminating such machine operations as quick-traverse, slow-travers, change of speed, stopping, etc.

Figure 2:
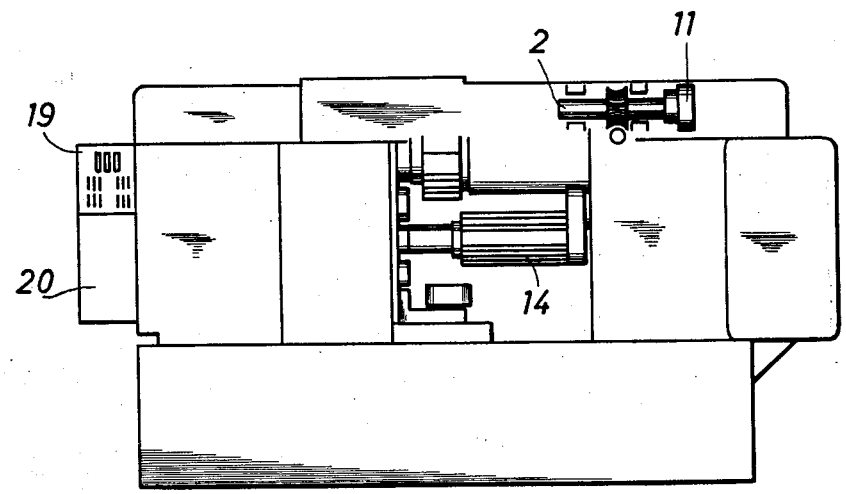
FIG. 2 depicts very schematically the general appearance of a multi-spindle automatic screw machine provided with a timing arrangement which does not make use of timing cams.

FIG. 2 depicts a multi-spindle automatic screw machine in which, by way of extreme design choice, all the cams and other mechanical components of the machine in FIG. 1 are omitted, and wherein instead the requisite timing functions are performed exclusively by the position and direction-indicating unit 11 and the associated control circuitry 19, which cooperates with non-illustrated machine control circuitry contained in a circuitry housing 20.

Figure 3:
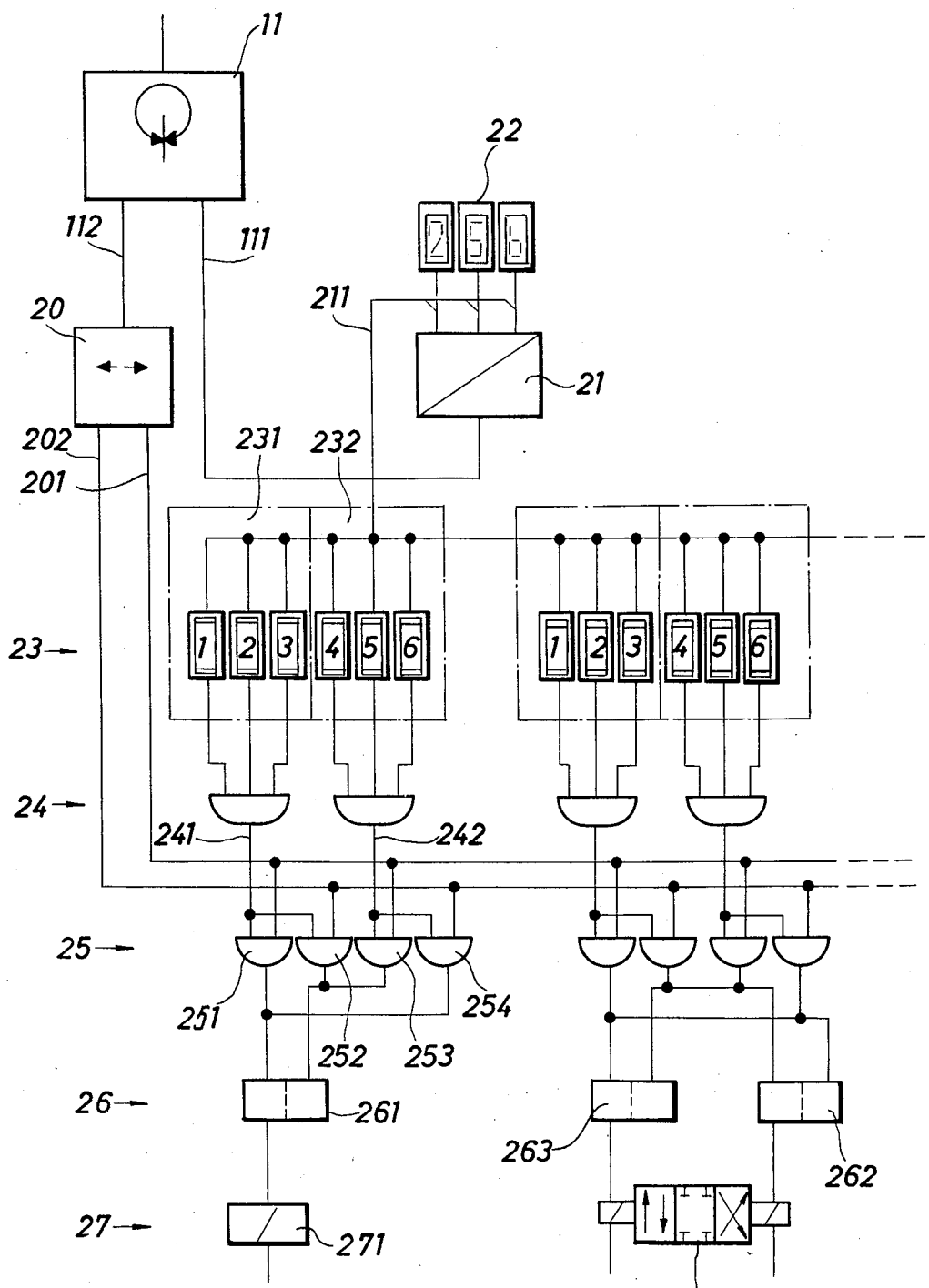
FIG. 3 depicts in schematic manner a circuit which can be used for the timing of operations in a multiple-spindle automatic screw machine, or other similar machine tool.

FIG. 3 depicts an exemplary embodiment of a circuit for use in the timing arrangement according to the invention.

The position- and direction-indicating arrangement 11 may for example comprise a disk mounted for rotation on the control shaft 2, the disk being provided with circumferentially successive groups of perforations, each group consisting of perforations aligned in radial direction, and each such group of perforations representing, for example, an integer from 1 to 360 in binary coded form, in correspondence to the 360° of rotation of the control shaft 2; evidently, greater or lesser resolution could be had, as desired. Such perforated disk can be made to cooperate with a photoelectric detector comprised of a plurality of light-sensitive elements equal in number to the maximum number of perforations in one such radially extending group of perforations. The signals appearing on the outputs of such detectors would together constitute a binary-code signal representing the angular position of the control shaft 2.

As mentioned before, the unit 11 is furthermore operative for generating a signal indicative of the direction of rotation of the control shaft. This can be accomplished in more than one way. For example, if the control shaft 2 is driven by a D.C. drive motor, then the unit 11 might include a circuit connected across the terminals of such D.C. drive motor and operative for applying to the input of discriminator 20 a predetermined fraction of the voltage across the motor terminals. The discriminator 20, in turn, may for example be comprised of two half-wave rectifiers operative for passing currents of one or the other polarity. Connected to the output of each such rectifier may be the input of an electronic switch which becomes conductive when the respective rectifier conducts current. When such electronic switch becomes conductive, the respective one of the two outputs 201, 202 of the discriminator 20 becomes energized. The aforedescribed voltage having a polarity indicative of the direction of rotation of shaft 2 is applied to discriminator 20 via line 112, whereas the binary-coded information indicative of shaft position is furnished via a plurality of lines, collectively designated 111, to the input of a binary-to-decimal decoder 21. Decoder 21 is provided with three groups of output terminals, each group of output terminals consisting of ten terminals. The ten output terminals of each group are connected to respective ones of the ten input terminals of a respective one of three conventional digital display devices together forming a shaft position indicator 22.

The thirty output terminals of decoder 21 are furthermore connected to the inputs of a plurality of decade switches, which in FIG. 3 are designated by reference numerals 1, 2, 3, 4, 5, 6. Reference numeral 231 designates a first group of three such decade switches, while reference numeral 232 designates a second group of three such decade switches. Each decade switch has ten inputs and a single output. Each decade switch has a manually rotatable dial which is movable to any one of 10 positions. The decade switch is provided with a wiper one end of which is electrically connected to the output terminal of the decade switch, with the other end of the wiper being connected to which-ever of the ten switch inputs corresponds to the setting of the switch dial. Accordingly, if a voltage is applied for example to the No. 4 input of the decade switch, the voltage will be transmitted to the output of the decade switch only if the dial of the switch is set to position No. 4.

The rightmost group of 10 output terminals of the binary-to-decimal decoder 21 is connected to the ten input terminals of the decade switches 3 and 6 in stages 231 and 232. The middle group of ten output terminals of the binary-to-decimal decoder 21 is connected to the ten input terminals of the decade switches 2 and 5 of the stages 231 and 232. The leftmost group of ten output terminals of the binary-to-decimal decoder 21 is connected to the ten input terminals of the decade switches 1 and 4 of the stages 231 and 232.

For the sake of clarity, all the many conductors which connect together these terminals are not shown in FIG. 3; use is instead made of the conventional single-conductor representation to represent the various groups of conductors.

Connected to the outputs of the switches 1, 2, 3 of stage 231 is an AND-gate having an output 241. Connected to the outputs of the switches 4, 5, 6 of stage 232 is an AND-gate having an output 242.

It is evident that a logical 1 signal will appear at the output 241 if and only if the angular position of the control shaft 2, as indicated by the signals on the thirty outputs of binary-to-decimal decoder 21, corresponds to the three-digit decimal number set on the bank of decade switches 231. Similarly, a logical 1 of AND-gates will appear at the output 242 if and only if the angular position of the control shaft 2 corresponds to the three-digit decimal number set upon the bank of decade switches 232.

The AND-gate outputs 241, 242 are connected to inputs of four further AND-gates 251, 252, 253, 254. The outputs of AND-gates 251, 252, 253, 254 are in turn connected to one or the other input of a flip-flop 261. One of the two outputs of the flip-flop 261 is connected to the winding 271 of an electromagnetically actuated clutch. The inputs of AND-gates 251, 252, 253, 254 which are not connected to the AND-gate outputs 241, 242 are connected to one or the other of the two outputs 201, 202 of the direction discriminator 20.

The arrangement shown in FIG. 3 operates as follows:

During the operation of the multi-spindle automatic screw machine the control shaft 2 rotates. The position- and direction-indicating unit 11 furnishes a signal, in binary coded form, over its plurality of outputs 111, this binary coded signal being indicative of the angular position of the control shaft 2. At the same time, the unit 11 applies via line 112 to discriminator 20 a potential whose polarity is indicative of the direction of shaft rotation, and either output 201 or output 202 becomes energized depending upon the direction in which shaft 2 rotates.

The binary-coded position-indicating signal on lines 111 are applied to the input of binary-to-decimal decoder 21, and corresponding signals appear at the thirty outputs of the decoder 21. There appears on position-indicating display device 22 a three-digit decimal number corresponding to the input binary-coded number and indicating visually the angular position of the control shaft.

Simultaneously, the signals on the thirty output terminals of decoder 211 are applied to respective ones of the inputs of the six decade switches 1, 2, 3, 4, 5, 6, of the stages 231, 232. When a changeover of workpiece is performed, the machine is adjusted by setting the dials of the switch group 231 to a three-digit decimal number indicating the angular position of shaft 2 at which the winding 271 of the electromagnetically actuated clutch should be energized. The dials of the switch group 232 are set to a three-digit decimal number indicating the angular position of shaft 2 at which the winding 271 should be de-energized.

When the shaft 2 reaches the angular position set on the switches of stage 231, the inut signals applied to the decade switches 1, 2, 3 of stage 231 will all pass to the outputs of such switches, and a logical 1 signal will appear on the AND-gate output 241. Accordingly, a logical 1 signal will be applied to one input of the AND-gate 251 and to one input of the AND-gate 252. If the control shaft 2 is rotating in the direction associated with the output 202 of discriminator 20, a logical 1 signal will appear at the output of AND-gate 251. This 1 signal will trigger flip-flop 261 to the state thereof wherein the winding 271 is energized. On the other hand, if the control shaft 2 is turning in the direction associated with discriminator output 201, then a 1 signal will appear at the output of AND-gate 252, and the flip-flop 261 will be triggered to the state thereof wherein winding 271 is de-energized.

As the control shaft 2 continues to turn, it will eventually reach the second angular position, set on the dials of stage 232. When this occurs, a 1 signal will appear at the AND-gate output 242, and will accordingly be applied to one input of AND-gate 253 and to one input of AND-gate 254. If the control shaft 2 is turning in the direction associated with discriminator output 201, a logical 1 signal will appear at the output of AND-gate 253, triggering flip-flop 261 to the state thereof wherein winding 271 becomes deenergized. On the other hand, if the shaft 2 is turning in the direction associated with discriminator output 202, a 1 signal will appear at the output of AND-gate 254, triggering flip-flop 261 to the state thereof wherein winding 271 becomes energized.

FIG. 3 shows a second group of decade switches 1, 2, 3, 4, 5, 6, in addition to those of stages 231, 232. Connected to the outputs of these additional switches are AND-gates equivalent to the AND-gates connected to the outputs of stages 231, 232. The operation is the same. However, the right-hand group of decade switches controls the times at which a four-port three-position valve 272 is to be moved to its first operative position and to its second operative position. The valve 272 is controlled by two control solenoids, which in turn are energized under the control of two flip-flops 263, 262. When the valve 272 is moved from one to the other of the operative positions thereof, the direction of fluid flow to a hydraulic consumer arrangement will be reversed. Such action may for example play a part in controlling the forward and retracting quicktraverse movements of one of the carriages or slides of the machine.

While only two control units have been shown, namely the winding 271 of an electromagnetically operated clutch and the control valve 271 of a hydraulic moving means, it is evident that additional decade switch stages and additional control units will ordinarily be provided, to control other machine operations. This is indicated by the broken lines in FIG. 3. The entire arrangement of decade switches is generally designated 23, the AND-gate arrangement of the decade switches 24, the AND-gate arrangement which combines the direction and position information 25, the flip-flop arrangement 26, and the control units 27.

It is to be understood that whereas the illustrated embodiment makes use of electrical circuits other types of circuitry can be employed, for example pneumatic circuits.

It will be understood that each of the elements described above, or two or more together, may also find a useful application in other types of cirucits and constructions differing from the types described above.

While the invention has been illustrated and described as embodied in an arrangement for controlling the operation of a multi-spindle automatic screw machine, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. In a machine tool of the type comprised of work tool means, workpiece holding means, a plurality of control units activatable for initiating and terminating respective predetermined movements of at least one of said means, and a timing arrangement for timing the activation of said control units, the improvement consisting in that the timing arrangement comprises a rotary timing member; first means for generation of a signal having a value indicative of the angular position of said rotary timing member; second means for detecting when said signal assumes a predetermined value corresponding to a predetermined angular position of said rotary timing member; and third means for activating a predetermined one of said control units in response to such detection, wherein said first means further includes direction-indicating means operative for generating a direction-indicating signal indicative of the direction of rotation of said rotary timing member, and wherein said third means consists of means for activating said predetermined one of said control units when said second signal assumes said predetermined value but only when said direction-indicating signal is indicative of rotation of said rotary timing member in a predetermined one of the two directions of rotation thereof.

2. In a machine tool of the type comprised of work tool means, workpiece holding means, a plurality of control units activatable for initiating and terminating respective predetermined movements of at least one of said means, a timing arrangement for timing the activation of said control units, said timing arrangement comprising a rotary timing member; first means for generation of a signal having a value which is indicative of the angular position of said rotary timing member, said signal progressively changing in response to progressive changes in the angular position of said rotary timing member; second means for detecting when said signal assumes a predetermined value corresponding to a predetermined angular position of said rotary timing member; and third means for activating a predetermined one of said control units in response to such detection.

3. In a machine tool as defined in claim 2, wherein said second means comprises selecting means for selecting said predetermined value.

4. A method of operating a machine tool of the type comprised of work tool means, workpiece holding means, a plurality of control units activatable for initiating and terminating respective predetermined movements of at least one of said means, and a rotary timing member, comprising the steps of generation of a signal having a value which is indicative of the angular position of the rotary timing member, said signal progressively changing in response to progressive changes in the angular position of the rotary timing member; detecting when the signal assumes a predetermined value corresponding to a predetermined angular position of the rotary timing member; and activating a predetermined one of the control units in response to such detection.

* * * * *